United States Patent Office 3,095,460
Patented June 25, 1963

3,095,460
PREPARATION OF STABILIZED MAGNESIUM ALKYLS
George A. Olah, Sarnia, Ontario, Canada, assignor to The Dow Chemical Company, Midland, Mich., a corporation of Delaware
No Drawing. Filed Oct. 25, 1961, Ser. No. 147,460
3 Claims. (Cl. 260—665)

This invention relates to the preparation of stabilized magnesium organics and more particularly is concerned with an improved process for the preparation of stabilized magnesium alkyl compounds which does not use highly flammable ether solvents. The term "magnesium alkyl" as used herein is meant to include magnesium organics wherein two alkyl, aryl, alkaryl or cycloalkyl groups are attached directly to a magnesium atom. The term "stabilized magnesium alkyl" as used herein is meant to include those magnesium alkyl·magnesium halide double salts or complexes of the composition R—Mg—R·MgX$_2$ where R is an alkyl, aryl alkaryl or cycloalkyl radical and X is a halogen anion selected from the group consisting of chlorine, bromine and iodine.

It is a principal object of the present invention to provide an improved process for preparing stabilized magnesium alkyls which compounds undergo the same type of reactions as conventional Grignard type reagents or magnesium dialkyls but which exhibit a marked stability against degradation upon standing as compared to that exhibited by convention magnesium dialkyls and Grignard type reagents.

It is another object of the present invention to provide a novel catalyst system which unexpectedly provides a rapid reaction rate for forming stabilized magnesium alkyls.

These and other objects and advantages will be apparent from the detailed description presented hereinafter.

A copending application, filed October 25, 1961, Serial No. 147,463, has disclosed a method for preparing stabilized magnesium alkyls by reacting an appropriate hydrocarbon halide with magnesium in a non-ether carrier and in the presence of a Lewis acid catalyst which may be either a Friedel-Crafts metal halide catalyst or a metal alkyl. In the process of this copending application with Friedel-Crafts type catalysts the reaction times necessary to prepare the corresponding stabilized magnesium alkyl compounds can be quite long, i.e. ranging up to 48 hours.

Now, unexpectedly it has been found that if an alkali metal hydride or alkaline earth metal hydride is mixed with the Friedel-Crafts metal halide catalyst and this admixture is employed as catalyst in the process the reaction time to obtain substantially complete reaction of the magnesium and production of the stabilized metal alkyl is markedly reduced.

Particularly suitable catalysts for use in the instant process are any of the Friedel-Crafts metal halide catalysts such as aluminum chloride, aluminum bromide, magnesium chloride, magnesium bromide, magnesium iodide, ferric chloride, ferric bromide, stannic chloride, stannic bromide, zirconium chloride or the like used in admixture with a metal hydride such as calcium hydride, magnesium hydride, sodium hydride and lithium hydride for example.

The amount of catalysts to be used is from about 0.1 to about 3 mole percent (as based on the total moles of magnesium and organic halide reactants present) and the catalyst mixture itself will contain a mole ratio of the Friedel-Crafts metal halide:metal hydride ranging from about 1.1 to about 1.5; i.e., the catalyst mixture will contain from about 10 to about 50 mole percent excess of the metal halide component.

Organic halides which are suitable for use as reactants in the instant process include for example straight chain and branced chain alkyl halides wherein the total number of carbon atoms range from 1 up to 8 or more, alicyclic halides containing up to 6 or more carbon atoms, halobenzene and halo substituted alkyl benzenes where the alkyl substituents are straight and branched chain radicals having carbon atoms ranging in number from about 1 to about 4.

Liquid carriers, which are used in the instant process are aliphatic, alkaryl, and aromatic based hydrocarbons and halo-substituted hydrocarbons including for example, cyclohexane, methylcyclohexane, benzene, toluene, excess of the halo-organic reactant, ligroin, etc. Normally the carrier will be selected from those materials within the boiling point range of from about 50 to about 250° C. Advantageously, if a carrier different than an excess of the organic halide reactant is employed, this carrier should be a member having a boiling point below that of the organic halide reactant in order to achieve a maximum of ebullition and agitation from natural reflux action without the need of additional stirring of the reaction mass.

It is apparent that a single stabilized magnesium alkyl product will be obtained using a chloro-, bromo- or iodo-substituted hydrocarbon as carrier only when this carrier compound is an excess of the organic halide reactant itself. Use of a halo-substituted hydrocarbon carrier which is different from the halo-organic reactant can result in a mixture of the corresponding stabilized magnesium alkyl compounds.

In carrying out the instant process, a mixture of comminuted magnesium, e.g. magnesium chips, turnings, pellets or powder and an organic halide are placed in a reaction vessel along with from about 1 to about 5 volumes of hydrocarbon carrier, the volume of the carrier being based on the volume of the organic halide reactant present. The mole equivalent ratio of magnesium to organic halide ranges from about 0.8 to 1, although preferably stoichiometric molar equivalents of the reactants are employed. From about 0.1 to about 3 mole percent, based on total moles of magnesium and organic halide reactant present, of the Lewis Acid Friedel-Crafts compound-metal hydride catalyst mixture also is introduced into the reaction vessel.

The reaction vessel ordinarily is equipped with a thermometer, or other temperature indicating means, reflux condenser, stirrer and means for heating.

The reaction admixture is heated at a temperature of from about 50° C. up to reflux and preferably at the reflux temperature, for a period of time ranging from about 1 hour up to about 6 hours or more, and preferably from about 1 to about 4 hours and in any event until all of the magnesium is consumed in the preparation of the corresponding stabilized magnesium alkyl compound. This product compound, because of its low solubility in the organic carrier separates as a solid from the reaction mixture as formed. At reaction temperatures lower than reflux, stirring of the reaction mixture may be desired to assure contacting the reactants with each other since the slurry resulting as formation of the product take place in the reacting mass tends to become viscous and sludge-like as the reaction proceeds to completion.

Ordinarily, the reaction is carried out at normal atmospheric pressures. However, if desired, superatmospheric pressures and reaction temperatures greater than the normal boiling point of the hydrocarbon or substituted hydrocarbon carrier or organic halide reactant can be employed if desired.

The resulting product has been found by conventional analytical techniques, e.g. active hydrogen determination and elemental analysis to be substantially all the desired stabilized magnesium alkyl compound.

Any excess organic halide and/or solvent carrier readily can be removed from the product as by distillation under reduced pressure thereby yielding the dry double salt product. This product can be stored in an anhydrous, inert atmosphere without any appreciable decomposition. Alternatively, the reagent as produced can be hydrolyzed or otherwise used, in situ, to give any of a number of predetermined products preparable from such reagents.

The following examples will serve to further illustrate the present invention without serving to limit it thereto.

EXAMPLE 1

A predetermined quantity of magnesium chips (0.5 gram mole) was introduced into a 1000 cubic centimeter three-necked flask fitted with a reflux condenser, dropping funnel, mechanical stirrer and thermometer. The flask was heated by an electric mantel. Organic solvent carrier was added to the magnesium chips in the flask along with a pre-determined amount of a Friedel Crafts compound-metal hydride catalyst mixture. The magnesium-organic carrier-catalyst mixture was heated to reflux and the organic halide reactant slowly added to the reaction mass through the dropping funnel until a total of about 0.5 gram mole had been introduced into the flask. The reaction was continued until the magnesium was consumed, after which time the excess solvent was removed. The resulting product was analyzed by conventional analytical techniques to obtain a determination of active hydrogen as well as to obtain elemental analysis. For comparative purposes a number of tests were run under the same conditions but using the corresponding Friedel-Crafts compound alone as catalyst. Table I which follows summarizes the results of these runs showing preparation of a variety of stabilized magnesium alkyl reagents.

and using about 1 mole percent of a catalyst mixture of ferric bromide:magnesium hydride having a bromide:hydride mole ratio of 1.3.

Various modifications can be made in the present invention without departing from the spirit or scope thereof for it is understood that I limit myself only as defined in the appended claims.

I claim:

1. In a process for preparing stabilized magnesium alkyl compounds in the absence of ether which comprises reacting in a liquid hydrocarbon carrier and in the presence of a catalyst at a temperature of from about 50° C. up to reflux a mixture of comminuted magnesium and an organic halide selected from the group consisting of alkyl, cycloalkyl alkaryl and aryl halides, the mole equivalent ratio of said magnesium to said organic halide in said mixture ranging from about 0.8 to about 1, the amount of catalyst employed being from about 0.1 to about 3 mole percent of the total moles of said magnesium and said organic halide reactant present in said mixture and the volume of said liquid hydrocarbon based carrier ranging from about 1 to about 5 times the volume of said organic halide reactant the improvement which comprises employing as catalyst a mixture of a Friedel-Crafts Lewis acid metal halide catalyst and a metal hydride selected from the group consisting of alkali metal and alkaline earth metal hydrides wherein the mole ratio of the metal halide: metal hydride ranges from about 1.1 to 1.5.

2. An improved process for preparing stabilized magnesium alkyls as defined in claim 1 wherein the Friedel-Crafts catalyst member of the reaction catalyst mixture is a member selected from the group consisting of aluminum chloride, aluminum bromide, magnesium chloride,

*Table I*

| Run No. | Organic Halide Reactant | Solvent [1] | Catalyst Type [2] | Mole Percent Used [3] | Reaction temp. (° C.) | Reaction time (hrs) [4] | Product |
|---|---|---|---|---|---|---|---|
| 1 | $C_6H_5Br$ | Bromobenzene | $MgH_2$—$AlBr_3$ | 1 | 156 | 1 | $(C_6H_5)_2Mg \cdot MgBr_2$ |
| 2 | $C_6H_5Br$ | do | $CaH_2$—$AlBr_3$ | 1 | 156 | 1.5 | $(C_6H_5)_2Mg \cdot MgBr_2$ |
| 3 | $C_6H_5Br$ | do | $AlBr_3$ | 1 | 156 | 6 | $(C_6H_5)_2Mg \cdot MgBr_2$ |
| 4 | $C_6H_5Cl$ | Chlorobenzene | $MgH_2$—$AlBr_3$ | 1 | 130 | 6 | $(C_6H_5)_2Mg \cdot MgCl_2$ |
| 5 | $C_6H_5Cl$ | do | $CaH_2$—$AlBr_3$ | 1 | 130 | 6 | $(C_6H_5)_2Mg \cdot MgCl_2$ |
| 6 | $C_6H_5Cl$ | do | $AlBr_3$ | 1 | 132 | 10 | $(C_6H_5)_2Mg \cdot MgCl_2$ |
| 7 | $C_6H_5Br$ | Bromobenzene | $NaH$—$AlCl_3$ | 1 | 150 | 2.5 | $(C_6H_5)_2Mg \cdot MgBr_2$ |
| 8 | $C_6H_5Br$ | do | $LiH$—$AlCl_3$ | 1 | 150 | 2.5 | $(C_6H_5)_2Mg \cdot MgBr_2$ |
| 9 | $C_6H_5Br$ | do | $AlCl_3$ | 1 | 156 | 12 | $(C_6H_5)_2Mg \cdot MgBr_2$ |
| 10 | $C_6H_5Br$ | do | $MgH_2$—$BBr_3$ | 2 | 156 | 2.5 | $(C_6H_5)_2Mg \cdot MgBr_2$ |
| 11 | $t$-$C_4H_9Br$ | Ligroin | $NaH$—$AlBr_3$ | 3 | 70 | 4 | $(t$-$C_4H_9)_2Mg \cdot MgBr_2$ |

[1] Solvent: organic halide reactant ratio was about 250 cc. solvent for 0.5 mole halide.
[2] Metal halide: metal hydride ratio about 1.3.
[3] Based on total moles of magnesium and organic halide reactant present.
[4] To reach approximately 100 percent conversion into stabilized magnesium alkyl.

In a manner similar to that described for the preceding examples methyl iodide can be reacted with magnesium in methylcyclohexane using about 2 mole percent of a mixture of $MgBr_2$ and $CaH_2$ (halide:hydride mole ratio 1.5) as catalyst. Similarly cyclohexyl chloride and magnesium can be reacted in ligroin using about 3 mole percent of a mixture of $SnCl_4$ and $NaH$ (halide:hydride mole ratio 1.1) as catalyst. Hexyl bromide and magnesium can be reacted in an excess of the organic halide as solvent magnesium bromide, magnesium iodide, ferric chloride, ferric bromide, stannic chloride, stannic bromide and zirconium chloride.

3. An improved process for preparing stabilized magnesium alkyls as defined in claim 1 wherein the catalyst mixture of the Friedel-Crafts metal halide Lewis acid catalyst and the metal hydride is employed in a metal halide:metal hydride mole ratio of about 1.3.

No references cited.